US006547838B1

(12) United States Patent
Lee et al.

(10) Patent No.: US 6,547,838 B1
(45) Date of Patent: Apr. 15, 2003

(54) SULFURIC POSITIVE ELECTRODE FOR USE IN LITHIUM SECONDARY BATTERY AND METHOD FOR MANUFACTURING THE SAME

(75) Inventors: Jai Young Lee, Daejeon Kwangyeok-si (KR); Hyo Jun Ahn, Kyoungsangnam-do (KR); Sang Cheol Han, Daejeon Kwangyeok-si (KR); Young Soo Han, Daejeon Kwangyeok-si (KR); Sung Chul Park, Daejeon Kwangyeok-si (KR); Sang Min Lee, Daejeon Kwangyeok-si (KR)

(73) Assignee: Korea Advanced Institute of Science & Technology, Kwangyeok-si (KR)

( * ) Notice: Subject to any disclaimer, the term of this patent is extended or adjusted under 35 U.S.C. 154(b) by 0 days.

(21) Appl. No.: 09/703,904

(22) Filed: Nov. 2, 2000

(30) Foreign Application Priority Data

Aug. 29, 2000 (KR) ......................................... 2000-50503

(51) Int. Cl.[7] .......................... H01M 6/00; H01M 4/58; H01M 4/88

(52) U.S. Cl. .................. 29/623.1; 429/218.1; 429/217; 429/232; 252/182.1

(58) Field of Search .............................. 29/623.1, 623.5; 429/218.1, 231.8, 223, 231.4, 217, 232; 252/182.1

(56) References Cited

U.S. PATENT DOCUMENTS

| 5,523,179 A | * | 6/1996 | Chu ........................... 429/104 |
| 5,993,990 A | * | 11/1999 | Kanto et al. ................... 429/62 |
| 6,306,545 B1 | * | 10/2001 | Carlson et al. ............. 429/247 |

* cited by examiner

Primary Examiner—Stephen Kalafut
Assistant Examiner—R Alejandro
(74) Attorney, Agent, or Firm—Rosenberg, Klein & Lee

(57) ABSTRACT

A sulfuric positive electrode for use in a lithium secondary battery whose life cycle is enhanced and a method for manufacturing the same are provided, in which nickel is added in sulfur that is an active material of a positive electrode. The sulfuric positive electrode manufactured by adding nickel that is an electrical conductor can solve the problem with respect to an electrode life cycle.

9 Claims, 2 Drawing Sheets

SULFURIC POSITIVE ELECTRODE FOR USE IN LITHIUM SECONDARY BATTERY AND METHOD FOR MANUFACTURING THE SAME

BACKGROUND OF THE INVENTION

1. Field of the Invention

The present invention relates to a sulfuric positive electrode for use in a lithium secondary battery and a method for manufacturing the same, and more particularly, to a sulfuric electrode having an enhanced electrode life cycle and a method for manufacturing the same.

2. Description of Prior Art

Portable electronic devices such as a notebook computer, a camcorder, a mobile phone and a compact recorder are being quickly developed. Accordingly, the portable electronic devices are widely being used and their demands are gradually increased. As a result, batteries that are energy sources became important. Among the batteries, a number of re-usable secondary batteries are sharply increased. In particular, a lithium secondary battery among the secondary batteries is most frequently being studied due to its high energy density and discharging voltage, and commercialized currently.

The most crucial portions in any battery as well as a lithium secondary battery are materials constituting negative and positive electrodes. In particular, a material that is used for the positive electrode of the lithium secondary battery should have a high discharging capacity, an inexpensive active material and an excellent electrode life cycle for a long-time use.

The positive electrode of a lithium sulfuric secondary battery has a theoretical capacity of 1,675 mAh/g, that is, a very high discharging capacity. The price of sulfur that is an active material is very low. Also, the lithium sulfuric secondary battery does not use heavy metal and thus is friendly environmental. However, the lithium sulfuric secondary battery has a very short electrode life cycle, which is a fatal demerit that is completely discharged within 30 cycles and is not charged and discharged any longer. The degeneration of the lithium sulfuric secondary battery has not been still clearly explained. Thus, there has not been clearly presented a method for enhancing an electrode life cycle. An experimental research for enhancing an electrode life cycle of the lithium sulfuric secondary battery has been performed by a processor, E. J. Cairns and his processor group in Berkley University, at Journal of Power Sources 89 (2000), pp21–226, in which solid electrolyte is changed from polyethylene-oxide (PEO) to polyethylene-glycol dimethyl ether. It can be seen that a discharging capacity is greatly decreased and the life cycle is little enhanced.

Under the circumstances, the inventors have discovered that an electrode life cycle can be enhanced without reducing a discharging capacity, when nickel (Ni) that is an electrical conductor is added to a sulfuric electrode material that is used as an active material of a lithium sulfuric battery that is promising as a next-generation lithium secondary battery positive material

SUMMARY OF THE INVENTION

To solve the prior art problems, it is an object of the present invention to provide a sulfuric positive electrode for use in a lithium secondary battery capable of enhancing an electrode life cycle without reducing a discharging capacity, by adding nickel that is an electrical conductor at the time of manufacturing a positive electrode of a lithium sulfuric secondary battery.

It is another object of the present invention to provide a method for manufacturing a sulfuric positive electrode for use in a lithium secondary battery capable of enhancing an electrode life cycle without reducing a discharging capacity, by adding nickel that is an electrical conductor at the time of manufacturing a positive electrode of a lithium sulfuric secondary battery.

To accomplish the above object of the present invention, according to the present invention, there is provided a method for manufacturing a sulfuric positive electrode for use in a lithium secondary battery, the method comprising the steps of: weighing sulfuric powder that is an active material and carbon powder and nickel powder that are electrical conductors and then ball-milling and mixing the weighed powder under an inactive atmosphere; stirring the mixed powder that is put in a solvent together with polyethylene-oxide (PEO), to thereby form a slurry for a positive electrode; and drying the slurry to obtain a sulfuric positive electrode.

According to another aspect of the present invention, there is provided a sulfuric positive electrode for use in a lithium secondary battery, which is manufactured by the above method.

The sulfuric positive electrode for use in a lithium secondary battery according to the present invention employs sulfur as an active material, polyethylene-oxide (PEO) as an ion conductor and a binder, and carbon and nickel as electrical conductors. Preferably, a small amount of lithium salt is additionally added.

The sulfur that is used as an active material for a sulfuric positive electrode in the present invention is directly reacted with lithium during discharging, to thereby form $Li_2S$. Inversely, during charging, $Li_2S$ is phase-separated into Li and S, according to a reversible reaction. It is preferable that a content of sulfur is 10–90% with respect to the weight of the whole electrode composition. The reason is because 100% sulfur is an electrical non-conductor and a lithium ion has no conductivity, the electrode cannot function. Accordingly, the carbon that is an electrical conductor forms slurry together with a polymer such as polyethylene-oxide that is an ion conductor. Meanwhile, in the case that sulfur of less than 10% is included, that is, when the sulfur content is too excessively small, a fabricated battery cell has a reduced discharging capacity and thus is of no practical use.

In the present invention, it is appropriate that the materials added as an electrical conductor and an ion conductor are 5–45% with respect to the total weight of the electrode composition, respectively.

Nickel is added together with carbon as an electrical conductor. Carbon and nickel play roles of improving electrical conductivity of electrons within a positive electrode, that is, an anode. According to the research of the inventors, the added nickel forms NiS that is a nickel sulfide, and thus plays a role of a catalyst at the time of an electrode reaction of sulfur and lithium. As a result, it is expected that the life cycle of the electrode would prolong. It is appropriate that the content of the added nickel according to the present invention is within the scope of 10–30% with respect to the total weight of the electrode composition.

In the case that the nickel content is less than 10%, the content of the electrical conductor is too excessively small, and thus it is difficult to expect a sufficient electrical conduction effect. Meanwhile, in the case that the nickel content exceeds 30%, the content of the sulfur that is an active material is relatively decreased and thus the battery capacity is undesirably decreased.

Meanwhile, in the case of the nickel powder added as an electrical conductor in the present invention, as the size of the particle is more finite, the electrode life cycle becomes longer. Thus, it is preferable that the nickel powder has the size of 30 μm or smaller in diameter. It is more preferable that the nickel powder has the size of 0.1–10 μm.

PEO constituting a positive electrode is a solid polymer and plays a role of a binder as well as an ion conductor of a lithium ion.

Meanwhile, it is preferable that the positive electrode according to the present invention can further contain a small amount of lithium salt within the scope of 1–10%. The lithium salt is added in order to enhance the conductivity of the lithium ions in the anode. The representative lithium salt is $LiCF_3SO_3$.

BRIEF DESCRIPTION OF THE DRAWINGS

The above object and other advantages of the present invention will become more apparent by describing the preferred embodiment thereof in more detail with reference to the accompanying drawings in which.

DETAILED DESCRIPTION OF THE EMBODIMENT

A preferred embodiment of the present invention will be described in more detail with reference to the accompanying drawings.

EXAMPLE

Sulfur of 0.2 g (10 wt %), filamentary type Ni of 0.4 g (20 wt %) and carbon of 0.2 g (10 wt %) have been weighed and prepared, and then ball-milled for 30 minutes under the argon atmosphere at one atmosphere for 20 minutes. Here, "Spex-8000 Mixer/Mill" has been used as a ball-milling machine. The ball-milled test piece has been put in acetonitryl (50 ml). that is a solvent together with polyethylene-oxide of 1.2 g (60 wt %) and a lithium salt of 0.1M, to then be stirred. The stirred anode slurry has been thinly coated on a flat glass plate in the thickness of 30–100 μm, and then dried in the air for 24 hours. Here, the thickness of the sulfuric electrode has been 35 μm. The dried sulfuric anode has been dried for 24 hours at the temperature of 60° C. again.

In the case of fabricated sulfuric anode, polyethylene-oxide has been used as an electrolyte and a lithium foil has been used as a cathode, to thereby constitute a lithium sulfuric secondary battery. A film of 30 μm thick has been used as the polyethylene-oxide used as an electrolyte, in which case three layers have overlapped.

The fabricated lithium sulfuric battery has been maintained for one hour at the temperature of 80° C. and then a charging and discharging test has been performed. According to a charging condition, the charging has been performed at a charging velocity of 50 $\mu A/cm^2$ for 8 hours. In order to prevent an excessive charging, the charging has made to be cut off automatically at 4.5V. According to a discharging condition, the discharging has been performed at a discharging velocity of 50 $\mu A/cm^2$ up to 1.0V. A rest time is given five minutes between the charging and discharging time.

Comparative Example

Except that sulfur of 0.2 g (10 wt %), and carbon of 0.6 g (30 wt %) have been weighed and prepared, and then ball-milled for 30 minutes under the argon atmosphere at one atmosphere for 20 minutes, a sulfuric anode has been fabricated in the same manner as the above example and then a battery has been fabricated, to have then performed a charging/discharging experiment.

Figure 1:
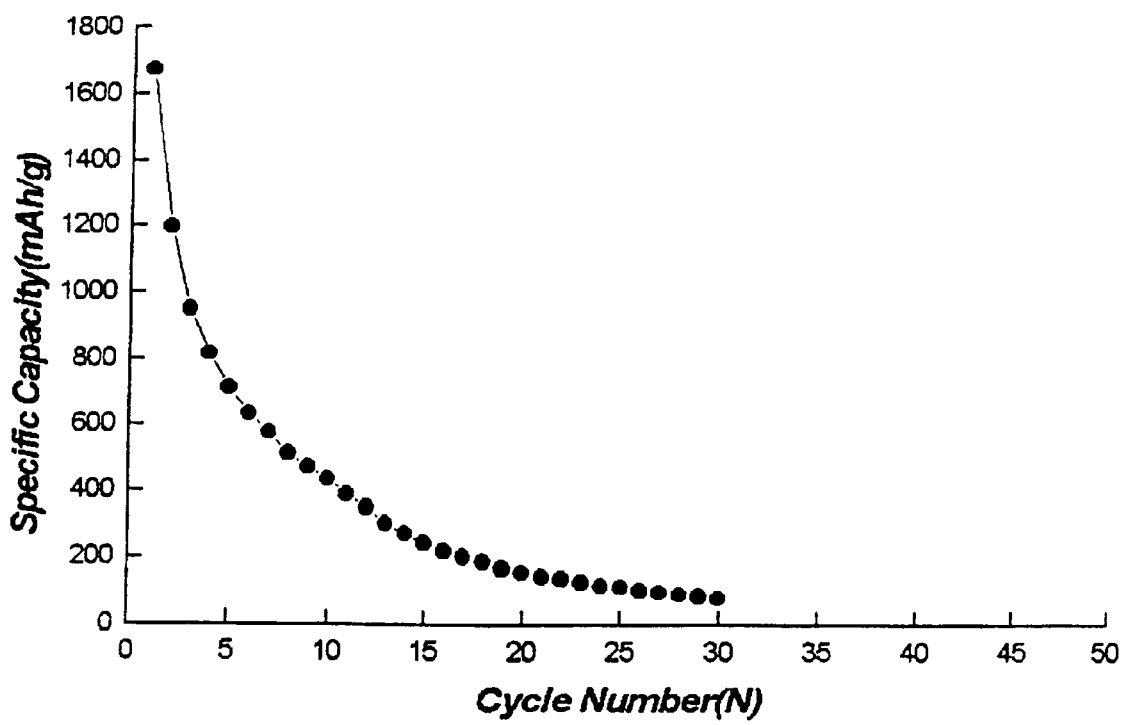
FIG. 1 is a graphical view illustrating an electrode life cycle of a conventional lithium sulfuric battery.
Figure 2:
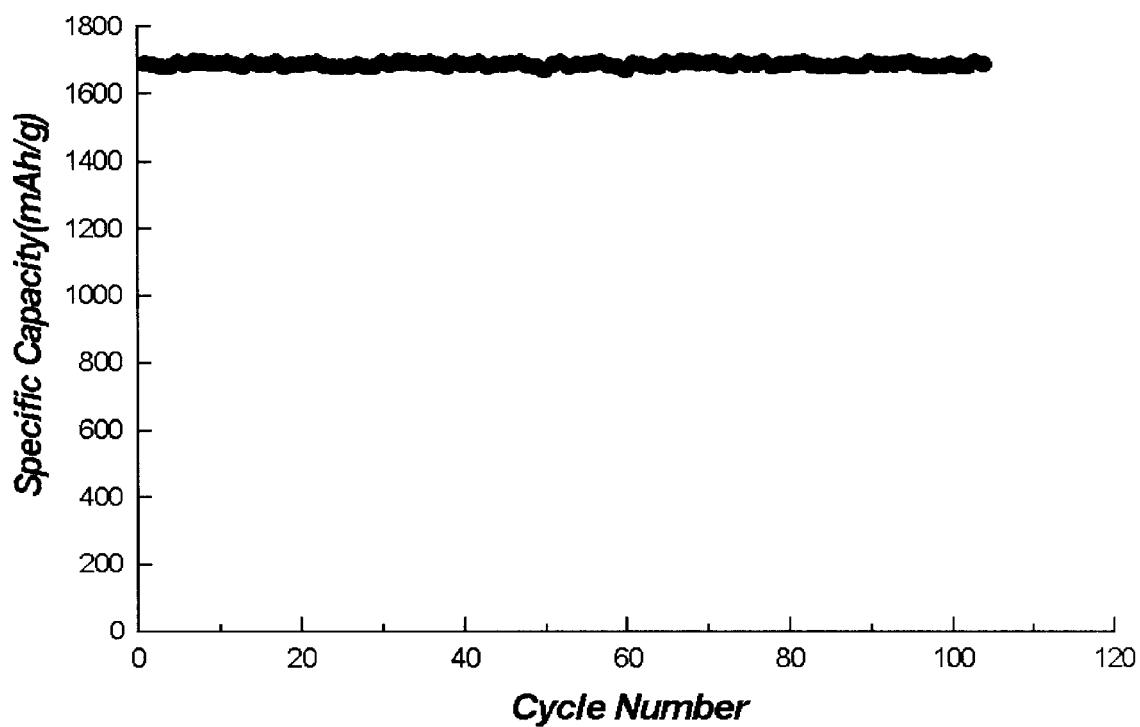
FIG. 2 is a graphical view showing an electrode life cycle of a lithium sulfuric battery according to the present invention.

The above results are illustrated in FIGS. 1 and 2.

FIG. 1 is a graphical view illustrating an electrode life cycle in the case that only carbon is used as an electrical conductor according to a conventional case. That is, in the case that the composition of the sulfuric anode is constituted by sulfur of 10 wt %, carbon of 30 wt %, PEO of 60 wt %, and a lithium salt of 0.1M, FIG. 1 shows that the electrode life cycle is completely degenerated within 30 cycles.

FIG. 2 is a graphical view showing an electrode life cycle in the case that nickel is added according to the present invention. In the case of a lithium sulfuric battery in which nickel of 20 wt % is added as an electrical conductor, that is, the composition of the sulfuric anode is constituted by sulfur of 10 wt %, nickel of 20 wt %, carbon of 10 wt %, PEO of 60 wt %, and a lithium salt of 0.1M, FIG. 2 shows that the initial discharging capacity is maintained without reducing a discharging capacity although 100 cycles have passed.

As described above, the present invention can fabricate a sulfuric electrode for use in a lithium secondary battery capable of enhancing an electrode life cycle without reducing a discharging capacity, by adding nickel that is an electrical conductor at the time of manufacturing a positive electrode of a lithium sulfuric secondary battery. Thus, the more lithium secondary batteries will be sold in the market for the secondary batteries that are used in home appliances such as mobile phones, camcorders and notebook computers. Also, an electric automobile that is a key performance factor in a low-price high-performance secondary battery can be developed faster. In particular, in the case of a hybrid car that uses both an engine and a motor, since the temperature of an engine room is sufficiently secured more than 80° C., the lithium sulfuric secondary battery is very promising as a backup battery.

While there have been illustrated and described what are considered to be a specific preferred embodiment of the present invention, it will be understood by those skilled in the art that the present invention is not limited to the specific embodiment thereof, and various changes and modifications and equivalents may be substituted for elements thereof without departing from the true scope of the present invention.

What is claimed is:

1. A method for manufacturing a sulfuric positive electrode for use in a lithium secondary battery, the method comprising the steps of:

weighing sulfuric powder that is an active material and carbon powder and nickel powder that are electrical conductors and then ball-milling and mixing the weighed powder under an inactive atmosphere;

stirring the mixed powder that is put in a solvent together with polyethylene-oxide (PEO), to thereby form a slurry for a positive electrode; and drying the slurry to obtain a sulfuric positive electrode.

2. The method for manufacturing the sulfuric positive electrode as recited in claim 1, wherein a content of sulfur is 10–90% with respect to the total weight of the electrode composition.

3. The method for manufacturing the sulfuric positive electrode as recited in claim 1, wherein the content of the nickel is 10–30% with respect to the total weight of the electrode composition of the sulfuric electrode.

4. The method for manufacturing the sulfuric positive electrode as recited in claim 1, wherein the positive electrode slurry further comprises a lithium salt.

5. The method for manufacturing the sulfuric positive electrode as recited in claim 4, wherein the lithium salt is $LiCF_3SO_3$.

6. The method for manufacturing the sulfuric positive electrode as recited in claim 3, wherein said nickel powder has the size of 30 µm or less.

7. The method for manufacturing the sulfuric positive electrode as recited in claim 1, wherein said solvent is acetonitryl.

8. The method for manufacturing the sulfuric positive electrode as recited in claim 6, wherein the size of said nickel powder is 0.1–10 µm.

9. A sulfuric positive electrode for use in a lithium secondary battery, which is manufactured according to the method claimed in claim 1 and having a nickle content in the range of 10–30% with respect to the total weight of the electrode composition of the sulfuric electrode.

* * * * *